Patented Sept. 4, 1945

2,384,143

UNITED STATES PATENT OFFICE 2,384,143

VINYL ESTERS

Franklin Strain, Barberton, and Frederick E. Küng, Akron, Ohio, assignors to Pittsburgh Plate Glass Company, Pittsburgh, Pa., a corporation of Pennsylvania No Drawing. Application February 29, 1944, Serial No. 524,484

9 Claims. (Cl. 260—463)

This application relates to new vinyl carbonate esters and to a method of preparing them. The new esters have valuable properties as are described hereinafter.

One purpose of this invention is to provide a method of substituting vinyl groups in molecular structures. A further purpose of the invention is to prepare vinyl carbonate esters which have not been prepared by any method previously known to the art. A new valuable group of compounds useful as drugs and insecticides or in the preparation of synthetic resins may thus be synthesized.

In an application previously filed by one of us (Serial 504,292 filed September 29, 1943, by Frederick E. Küng) a method of preparing vinyl chloroformate by the pyrolysis of ethylene glycol bis (chloroformate) at 400 to 600° C. was described and claimed.

We have now discovered that valuable carbonate esters may be prepared from vinyl chloroformate by reaction with hydroxy compounds in which at least one hydroxy group is adjacent to a carbon atom to which is bound only carbon and hydrogen atoms. Although the reaction may be conducted at any temperature, the yields are better when temperatures below normal room temperature are used. Accordingly, temperatures below 20° C. and preferably below 10° C. are used. Artificial cooling may be used to maintain the desired low reaction temperature. The reaction evolves hydrogen chloride which must be driven off by the use of elevated temperatures or neutralized by reaction with an alkaline reagent such as pyridine or other cyclic tertiary amine, or the oxides, hydroxides, and carbonates of alkali metals and alkali earth metals.

The vinyl chloroformate and the vinyl carbonates are quite readily hydrolyzed and accordingly, the reaction should be conducted under conditions which avoid or minimize the presence of water, strong alkali, or strong acid. This may be achieved by using anhydrous reagents and by using pyridine as the alkaline agent. For economic reasons caustic soda is frequently used, but in such manner as to avoid excessive temperatures and the presence of large concentrations of caustic in contact with either the chloroformate or the carbonate ester. Thus, the reaction is conducted by adding the caustic soda gradually to a mixture of hydroxy compound and chloroformate, or by adding chloroformate and caustic in separate streams to the hydroxy compound. This gradual addition is used to maintain the temperature within desired limits. The heat of reaction is dissipated by cooling and the reagents are added at such rate that the temperature remains constant or below a prescribed maximum. The reaction mass is stirred vigorously during the reaction to avoid local excesses of reagents and temperature. After the reagents are combined the mixture is stirred for a period of time, fifteen minutes to one hour, to enable the completion of the reaction.

The esters are purified by washing out the alkali salts or addition products with water. When anhydrous conditions are used the sodium chloride or pyridine hydrochloride will exist in solid phase and sufficient water should be added to dissolve said salts and thereby produce two liquid phases. Any excess alkaline agent may be neutralized with dilute hydrochloric acid or by washing with sodium bisulfite. The ester layer may be washed one or more times with water or salt solutions and dried in the presence of anhydrous sodium sulfate or other solid desiccating agent.

The vinyl carbonate esters may be purified by distillation techniques. The more volatile esters can be distilled at atmospheric pressures, while the less volatile esters may require vacuum techniques. Other esters which cannot be vaporized without decomposition are purified by topping, i. e., by heating to evolve the more volatile impurities.

Suitable hydroxy compounds for the practice of this invention are the monohydroxy alcohols such as methyl, ethyl, n-butyl, t-butyl, propyl, cetyl, benzyl and cyclohexyl alcohols and the unsaturated alcohols such as allyl, methallyl, crotyl and cinnamyl alcohols. The dihydroxy alcohols are also useful, for example the glycols such as ethylene glycol, propylene glycol, trimethylene glycol, the butylene glycols, the di-, tri-, and tetrapropylene glycols and the polybutylene glycols. Higher polyhydric alcohols such as glycerol, erythritol, and polyvinyl alcohol are also useful. The invention may also be practiced with complex ester alcohols such as glycol dilactate, bis (2-hydroxyethyl) phthalate, ethyl glycolate, phenyl cellosolve, glycol bis (N-hydroxyethyl) carbamate and other compounds containing one or more hydroxyl groups adjacent an aliphatic carbon.

Other hydroxy compounds having application in the practice of this invention are the phenols. These are compounds having at least one hydroxy group attached to a benzene ring. They may be monohydroxy compounds such as phenol, the cresols, methoxy phenol, allyl salicylate, and eugenol. The polyhydroxy compounds may also be used, for example, resorcinol, pyrogallol, ethylene glycol disalicylate and other compounds containing more than a single benzenoid hydroxyl group.

Compounds containing both alcoholic and phenolic hydroxy groups are also contemplated by this disclosure. Thus salicyl alcohol and ethylene glycol monosalicylate may be reacted with vinyl chloroformate thereby converting both types of hydroxyl groups into vinyloxycarboxylate groups.

Monohydroxy compounds such as ethyl lactate, t-butyl alcohol, ethylene glycol monoacetate, phenol, benzyl alcohol and other similar compounds react with vinyl chloroformate to form resin monomers capable of polymerization in the presence of peroxy catalysts to form transparent, colorless, thermoplastic resins. Compounds of this type which are made by reacting alkyl alcohols with vinyl chloroformate are described and claimed in copending application Serial No. 524,482, filed by us on Feb. 29, 1944 (now Patent No. 2,377,111, May 29, 1945).

Polymerizable compounds capable of being transformed into infusible insoluble resins by heating in the presence of peroxy polymerization catalysts are prepared by reacting dihydroxy compounds, such as glycol, resorcinol, bis (2-hydroxy ethyl) phthalate and diethylene glycol diricinoleate, with vinyl chloroformate. These compounds have two unsaturated groups which after polymerization form a network of linear chain polymers cross-linked by means of the second functional group.

Other difunctional esters capable of being polymerized to insoluble and infusible resins may be prepared by reacting unsaturated monohydroxy compounds such as allyl alcohol, glycol monomethacrylate, allyl lactate, N-(2 hydroxy ethyl) allyl carbamate with vinyl chloroformate. Of these compounds the type prepared by reaction of vinyl chloroformate with unsaturated monohydroxy alcohols are described and claimed in application Serial No. 524,483, filed by us on Feb. 29, 1944 (now Patent No. 2,370,589, Feb. 27, 1945).

In copending application Serial No. 524,481, filed Feb. 29, 1944 by one of us (Frederick E. Küng) now Patent No. 2,370,549, Feb. 27, 1945, there is described and claimed another method by which one of our new compounds may be prepared. The preparation of the methyl vinyl carbonate esters is therein described by the pyrolysis of ethylene glycol bis (methyl carbonate).

Further details of the preparation and use of the vinyl chloroformate esters will be found in the following specific examples.

*Example I*

A one liter reaction flask was provided with a stirring mechanism, a dropping funnel for the addition of reactants, and a thermometer for measuring the temperature within the flask. A bath of salt-ice mixture was also provided and the flask submerged therein. Two mols of vinyl chloroformate (212 g.) were placed in the flask and cooled to 0° C. A mixture of 100 g. ethyl alcohol and 375 cc. of 20 percent aqueous caustic soda (slight excess) was added dropwise from the dropping funnel at the rate of 5 cc. per minute until 150 cc. had been added and then as fast as possible without exceeding a reaction temperature of 10° C. The reaction mixture was stirred continuously to avoid local overheating. After all of the reactants had been combined, the mixture was stirred for 15 minutes to complete the reaction. Thereafter, the liquid was allowed to settle, two liquid phases were separated and the aqueous layer discarded. The ester layer was neutralized with a 15 percent hydrochloric acid solution and washed with four 150 cc. portions of saturated NaCl solution. After drying in contact with anhydrous sodium sulfate, the ester mixture was distilled and decolorized by heating with one gram of activated charcoal. A water-white liquid, ethyl vinyl carbonate, was thereby produced.

*Example II*

A mixture of 35 g. of methyl alcohol and 87 g. of pyridine (each 10 percent in excess of the stoichiometric amount) was placed in a 500 ml. flask equipped with stirring mechanism. Vinyl chloroformate (106 gms.) was introduced gradually at a rate which permitted the maintenance of the reaction temperature below +8° C. The flask was submerged in an ice bath throughout the reaction and the contents were stirred vigorously to assist the dissipation of the heat of reaction. When the reaction was complete, the precipitated pyridine hydrochloride and the excess pyridine were washed out with dilute hydrochloric acid. The ester was separated from the immiscible water layer and was washed with a saturated solution of sodium bisulfite and with a 100 cc. portion of water. Traces of water were removed by maintaining the ester in contact with sodium sulfate for 18 hours. After distillation to remove side reaction products, methyl vinyl carbonate was obtained as a colorless liquid.

*Example III*

Vinyl chloroformate (106 g.), prepared by the pyrolysis of ethylene glycol dichloroformate and purified by distillation, was slowly introduced into a 1000 ml. reaction flask containing 64 g. allyl alcohol (10 percent excess) and 87 g. of pyridine (10 percent excess) cooled to 0° C. on an ice bath. During the reaction the mixture was vigorously stirred to prevent local overheating. The addition of the reactants was made through a dropping funnel at a rate which permitted the maintenance of the temperature below 10° C. After the reagents were combined the mixture was stirred for 15 minutes to complete the reaction. About 250 cc. of 10 percent hydrochloric acid solution was added to neutralize the excess pyridine and to dissolve the pyridine hydrochloride which precipitated during the reaction. The ester was then washed with three 100 cc. portions of water and dried over anhydrous sodium sulphate. A clear colorless liquid, vinyl allyl carbonate, was obtained by distillation.

*Example IV*

One mole of vinyl chloroformate (106 g.) was placed in a reaction flask provided with a dropping funnel, stirrer and a thermometer. After cooling to 0° C. a mixture of 86 g. methallyl alcohol and 225 g. of 20 percent NaOH solution was added gradually with constant stirring at the rate of 3 g. per minute for ten minutes, then 5 g. per minute for 10 minutes and finally the balance at the rate of 10 g. per minute. The temperature rose to a maximum of 12° C. during the first ten minutes but thereafter did not exceed 8° C. After the reagents were completely mixed the stirring was continued for 30 minutes while maintaining the temperature below 10° C. Cold dilute (10 percent) hydrochloric acid was added in amount sufficient to neutralize the excess NaOH. Two distinct liquid phases were thereby formed. The ester layer was then separated from the aqueous layer, washed three times with 100 cc. portions of saturated NaCl solution and immediately dried over anhydrous sodium sulphate. The crude ester was purified by distillation which process removed the volatile side-reaction products. Traces of yellow color were removed by heating with activated charcoal. Methallyl vinyl carbonate, a colorless liquid ester, having the following structural formula was obtained:

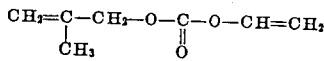

Example V

One mol of diethylene glycol and 2.4 mols of pyridine (20 percent excess) were mixed in a reaction flask provided with a mechanical stirring device, a dropping funnel and a thermometer. The flask was submerged in an ice bath. Vinyl chloroformate (2.2 mols) was introduced dropwise at a rate which enabled the maintenance of the reaction temperature between 0 and 5° C. When all of the reactants had been combined with constant stirring, the mixture was stirred for two hours more to assure completion of the reaction. A slurry of pyridine hydrochloride was thereby obtained. Sufficient water was added to dissolve all of the solid matter, a two liquid phase system being formed. The oil phase was separated and washed as follows: once with 20 percent pyridine, once with water, five times with dilute HCl, once with water, five times with sodium bisulphite and finally five times with water. The ester was decolorized by heating at 70° C. with 0.5 percent of activated carbon for one hour. The more volatile impurities were removed by heating to 100° C. at 2-3 mm. total pressure. The resulting liquid ester had a specific gravity of 1.178 and an index of refraction (20° C.) of 1.4491. It was identified as diethylene glycol bis (vinyloxycarboxylate) having the structure:

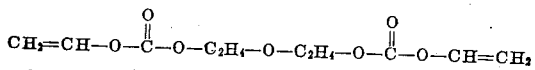

A mold was prepared from two 6" x 6" glass plates and a soft flexible strip of "Koroseal" ¼" x ⅜", used as an edge gasket by inserting between the outer edges of the plates. The mold parts were held in position with C clamps. The mold was filled with diethylene glycol bis (vinyloxycarboxylate) containing 0.1 percent of isopropyl percarbonate dissolved therein. The assembly was placed in a constant temperature room at 45° C. for 48 hours after which it was heated to 80° C. for two hours. When the glass plates were separated a clear colorless sheet of hard glass-like polymer was obtained.

Example VI

A mixture of 94 g. of phenol and 81 g. pyridine was placed in a 500 cc. three necked flask which was provided with a stirring device, a thermometer, and a dropping funnel. Vinyl chloroformate (110 cc.) was introduced through the dropping funnel at the rate of one cc. per minute for 15 minutes, then 2 cc. per minute for 15 minutes and finally 3 to 5 cc. per minute until all of the chloroformate was added. During the reaction the mixture was stirred continuously to avoid local excesses of reagents and heat of reaction. When the reaction was complete 200 cc. of ice water was added to dissolve the pyridine hydrochloride. The two liquid phases thereby produced were separated. The non-aqueous liquid was washed with 15 cc. of 5 percent hydrochloric acid, twice with 100 cc. of sodium bicarbonate and twice with 100 cc. of water. After drying with anhydrous sodium sulfate the ester was topped at 100° C. at 20 mm. total pressure. It was further purified by distillation at 75° C. to 80° C. at a total pressure of 3-4 mm. Phenyl vinyl carbonate, a colorless liquid ester having an index of refraction 1.5033 and the following structure was thereby obtained:

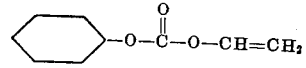

Example VII

A mixture of 52 g. of allyl lactate and 38 g. of pyridine was placed in a three necked flask provided with a mechanical stirrer, a thermometer and a dropping funnel. The flask was immersed in a bath of salt ice mixture. When the flask contents had been cooled to 0° C., vinyl chloroformate (50 g.) was slowly added dropwise at a rate which enabled the maintenance of the temperature below +5° C. The combination of reagents required 60 minutes during which time the mixture was stirred continuously. The reaction mass was stirred for 90 minutes after all of the vinyl chloroformate had been added.

The crude reaction mass was washed with just sufficient water to dissolve the solid pyridine hydrochloride and then with 5 percent HCl to remove the excess pyridine. After further washing with half saturated sodium bicarbonate, water, sodium bisulfite and again with water, the ester was dried over anhydrous Na₂SO₄ and distilled at 14 mm. pressure (B. P. 111°-113° C.). The resulting compound was identified as (1-carballyloxy ethyl) vinyl carbonate having the molecular structure:

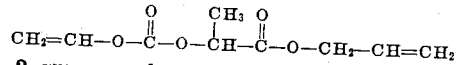

A 2 gm. sample was heated with 0.1 percent benzoyl peroxide at 70° C. and was polymerized to a very hard colorless transparent resin.

Example VIII

A 5 percent solution of polyvinyl alcohol in 500 cc. pyridine was cooled to 0° C. in a reaction flask equipped with a stirring mechanism, thermometer and dropping funnel. The flask was cooled by contact with an ice-salt mixture. The contents of the flask were stirred vigorously while 35 g. of vinyl chloroformate were introduced through the dropping funnel over a period of 70 minutes. The reaction mass was stirred for two hours while being permitted to warm to room temperature (18° C.). The mixture was then poured into about 1500 cc. of 2 percent hydrochloric acid solution and a white solid was precipitated which was dissolved in acetone and reprecipitated by addition of water.

A 5 g. sample was mixed 0.04 g. of benzoyl peroxide and heated at 125° C. in a small mold under 500 pounds per square inch pressure. A hard insoluble and infusible resin was thereby obtained.

In addition the new method is useful in preparing vinyl carbonate compounds by reacting part of the hydroxy groups of a polyhydroxy alcohol or phenol. Thus, ethylene glycol monoallyl carbonate may be prepared by treating more than one mole of glycol with each mole of vinyl chloroformate. The hydroxy containing vinyl carbonate esters may be separated from the excess polyhydroxy compound by extracting with suitable solvents or, in some cases, by distillation. They are useful as intermediates in the preparation of polymerizable monomers by the reaction of two moles of the hydroxy containing vinyl carbonate with one mole of phosgene or other acid chloride of a dibasic acid.

Similar useful polymerizable compositions may be prepared by treating the polyhydroxy alcohol (or phenol) with vinyl chloroformate in such proportions that mixtures of hydroxy containing vinyl carbonates and compounds having all hydroxy groups substituted with vinyl carbonate linkages are first formed. Subsequent treatment with phosgene or with the other acid chlorides will yield a mixture of polyunsaturated polymerizable compounds capable of being polymerized in the manner described for the pure compounds.

Although the invention has been described with respect to specific embodiments, it is not intended that the details thereof shall be construed as limitations of the invention except as included in the following claims.

We claim:
1. A method of preparing mixed vinyl carbonate esters which comprises reacting vinyl chloroformate with an hydroxy compound of the group consisting of alcohols and phenols.
2. A method of preparing mixed vinyl carbonate esters which comprises reacting vinyl chloroformate with an hydroxy compound of the group consisting of alcohols and phenols, in the presence of an alkaline reagent at a temperature below 20° C.
3. A method of preparing mixed vinyl carbonate esters which comprises reacting vinyl chloroformate with an hydroxy compound of the group consisting of alcohols and phenols, said reactants being in the proportion of approximately 1 mole of hydroxy compound for $x$ moles of vinyl chloroformate wherein $x$ is equal to the number of hydroxy groups on the hydroxy compound.
4. A method of preparing mixed vinyl carbonate esters which comprises reacting vinyl chloroformate with an hydroxy compound of the group consisting of alcohols and phenols in the presence of an alkaline reagent, said reacants being in the proportion of 1 mole of hydroxy compound for $x$ moles of vinyl chloroformate wherein $x$ is equal to the number of hydroxy groups on the hydroxy compound.
5. A method of preparing mixed vinyl carbonate esters which comprises reacting vinyl chloroformate with an hydroxy compound of the group consisting of alcohols and phenols, in the presence of an alkaline reagent at a temperature below 20° C., said reactants being in the proportion of approximately 1 mole of hydroxy compound for $x$ moles of vinyl chloroformate wherein $x$ is equal to the number of hydroxy groups on the hydroxy compound.
6. A method of preparing mixed vinyl carbonate esters which comprises reacting vinyl chloroformate with an hydroxy compound of the group consisting of alcohols and phenols in the presence of an alkaline reagent at a temperature below 10° C., said reactants being in the proportion of 1 mole of hydroxy compounds for $x$ moles of vinyl chloroformate wherein $x$ is equal to the number of hydroxy groups on the hydroxy compound.
7. A method of preparing vinyl phenyl carbonate which comprises reacting equimolecular quantities of vinyl chloroformate and phenol in the presence of an alkaline reagent at a temperature below 20° C.
8. As a new compound an ester having the molecular structure:

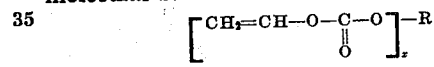

wherein R is a radical having a valence equal to a small whole number $x$, said radical being the hydrocarbon nucleus of a compound from the group consisting of alcohols and phenols.
9. As a new compound, vinyl phenyl carbonate.

FRANKLIN STRAIN.
FREDERICK E. KÜNG.